(12) United States Patent
Wisotzky

(10) Patent No.: US 7,070,337 B2
(45) Date of Patent: Jul. 4, 2006

(54) WHEEL BEARING FOR A DRIVEN RIGID AXLE

(75) Inventor: Axel Wisotzky, Frickenhausen (DE)

(73) Assignee: DaimlerChrysler AG, Stuttgart (DE)

( * ) Notice: Subject to any disclaimer, the term of this patent is extended or adjusted under 35 U.S.C. 154(b) by 134 days.

(21) Appl. No.: 10/479,996

(22) PCT Filed: May 3, 2002

(86) PCT No.: PCT/EP02/04844

§ 371 (c)(1),
(2), (4) Date: Jun. 15, 2004

(87) PCT Pub. No.: WO02/100663

PCT Pub. Date: Dec. 19, 2002

(65) Prior Publication Data

US 2004/0234185 A1    Nov. 25, 2004

(30) Foreign Application Priority Data

Jun. 9, 2001    (DE) ............................... 101 28 073

(51) Int. Cl.
*B60B 27/02* (2006.01)
(52) U.S. Cl. .................. 384/589; 301/111.01
(58) Field of Classification Search ................ 384/544, 384/589; 301/105.1, 111, 137, 111.01
See application file for complete search history.

(56) References Cited

U.S. PATENT DOCUMENTS

| 4,421,197 | A |   | 12/1983 | Chandioux |          |
|-----------|---|---|---------|-----------|----------|
| 6,017,097 | A | * | 1/2000  | Weir, III | 301/105.1 |
| 6,224,266 | B1| * | 5/2001  | Ohtsuki et al. | 384/571 |
| 6,543,858 | B1| * | 4/2003  | Melton    | 301/137  |
| 6,886,987 | B1| * | 5/2005  | Shevket et al. | 384/589 |

FOREIGN PATENT DOCUMENTS

| DE | 197 44 871 A1 | 4/1999  |
|----|---------------|---------|
| EP | 1 153 768 A1  | 11/2001 |
| FR | 2 687 614     | 8/1993  |
| WO | 95/13198      | 5/1995  |

\* cited by examiner

*Primary Examiner*—Thomas R. Hannon
(74) *Attorney, Agent, or Firm*—Crowell & Moring LLP

(57) ABSTRACT

A wheel bearing for a driven rigid axle, having a drive shaft includes a rolling bearing unit which comprises at least one inner race and at least one outer race, an inner race which is oriented toward the outside of the vehicle being designed with an end flange aligned in this direction, and further includes at least along a partial region of its length, a hub profile of a shaft-hub connection, the hub profile being connected to a complementary profile arranged on the drive shaft, an axle body which is mounted in a rotationally fixed manner on the vehicle body, radially surrounds the drive shaft at least along a partial region of its length and forms or accommodates an outer race of the rolling bearing unit, a wheel flange which accommodates at least one drive wheel, and a brake disk which comprises a friction ring and a brake-disk chamber, the brake disk being releasably fastened together with the wheel flange to the end flange of the inner race. In the wheel bearing, the brake disk can be removed without detaching the bearing.

14 Claims, 1 Drawing Sheet

WHEEL BEARING FOR A DRIVEN RIGID AXLE

CROSS REFERENCE TO RELATED APPLICATIONS

This application is a U.S. national phase of International Patent Application No. PCT/EP02/04844, filed May 3, 2002, designating the United States of America, and published in German as WO 02/100663 A1, the entire disclosure of which is incorporated herein by reference. Priority is claimed based on German Patent Application No. 101 28 073.4, filed Jun. 9, 2001.

BACKGROUND AND SUMMARY OF THE INVENTION

The invention relates to a wheel bearing for a driven rigid axle, having a drive shaft which is mounted in or on an axle body.

Elements of this invention are disclosed in DE 197 44 871 A1. A rolling bearing, for example of a multi-link axle, bears axially with its inner race against a shaft shoulder of the drive shaft while the outer race is pressed into an axle stub. The brake disk, which has a wheel-supporting surface, sits with a serrated profile on a corresponding mating profile of the drive shaft. With the aid of a central screw on the drive shaft, the brake disk is clamped against the rolling bearing and the latter is clamped against the shaft shoulder of the drive shaft. Including the thread, there are five settlement joints in this case.

If the brake disk is removed, the central fastening screw has to be undone. In the process, the inner race of the rolling bearing can be released from bearing against the shaft shoulder. After installation of, for example, a new brake disk, the central screw is tightened again.

There is the risk here of the rolling bearing being prevented, for example because of fretting corrosion, from reaching its original position on the shaft shoulder. This may lead to the joints of the connection settling, which may cause a reduction in the prestressing force.

The transverse and longitudinal forces acting on the wheel during the driving mode act directly as an alternating stress on the wheel-bearing fastening and can thus further loosen the wheel fastening.

The problem on which the present invention is based is therefore to develop a wheel bearing for a driven rigid axle, in which it is possible to remove a brake disk without releasing the wheel bearing.

This problem is solved by the features of the invention described and claimed herein. For this purpose, the wheel bearing is provided with a rolling bearing unit which comprises at least one inner race and at least one outer race, an inner race which is oriented toward the outside of the vehicle being designed with an end flange aligned in this direction and having, at least along a partial region of its length, a hub profile of a shaft-hub connection, the hub profile being connected to a complementary profile arranged on the drive shaft, having an axle body which is mounted in a rotationally fixed manner on the vehicle body, radially surrounds the drive shaft at least along a partial region of its length and forms or accommodates an outer race of the rolling bearing unit, having a wheel flange which accommodates at least one drive wheel, and having a brake disk which comprises a friction ring and a brake-disk chamber, the brake disk being releasably fastened together with the wheel flange to the end flange of the inner race.

In order to remove the brake disk, the releasable connection, with which the brake disk and the wheel flange are fastened to the inner race of the rolling bearing unit, is released. In the meantime, the rolling bearing unit can be fixed axially and/or radially. In order to change the brake disk, the latter is removed together with the wheel flange. A new brake disk is then fitted in turn together with the wheel flange and fastened releasably to the inner race of the rolling bearing unit. Only this connection has to be released and fastened again in order to change the brake disk. No additional components are released or loosened in the process. Including the thread, there are at most four settlement joints in the fastening of the releasable connection.

The torque from the drive shaft is transmitted via a form-fitting shaft-hub connection to the inner race of the rolling bearing unit. Via the end flange on the inner race of the rolling bearing unit, the torque is passed on further via the frictional flange connections between the inner race and the brake disk and between the brake disk and the wheel flange to the wheel flange and from there to the wheels. The wheel flange may also be part of the brake disk. In this case, a driving torque from the inner race is transmitted via a frictional connection to the brake disk and is passed on from there directly to the wheel flange.

A braking torque is transmitted by the brake disk to the wheel flange. If a brake disk is integrated in the wheel flange, the braking torque is passed directly from the brake disk into the wheel flange. If the brake disk and the wheel flange are separate components, the transmission of the braking torque takes place, for example, via a frictional and/or form-fitting connection between the brake disk and the wheel flange.

The brake disk can be centered during installation and can be fitted simply and securely.

DETAILED DESCRIPTION OF THE DRAWINGS

Figure 1:
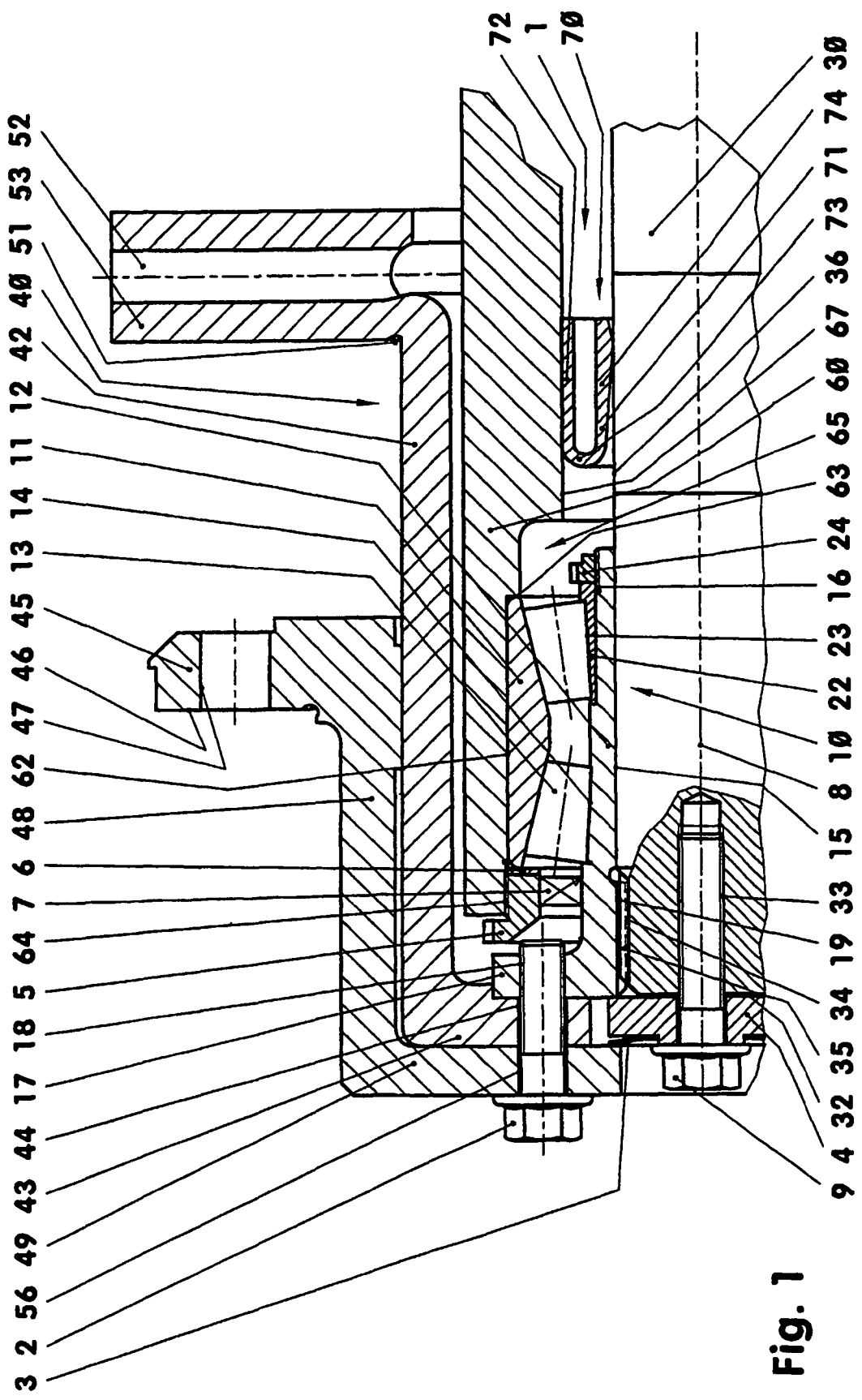
FIG. 1 illustrates a wheel bearing for a driven rigid axle.

FIG. 1 shows the wheel bearing for a driven rigid axle, for example a rear axle with dual tyres for a commercial vehicle. The individual driven wheel (not illustrated here) is mounted via a rolling bearing unit (10) on an axle body (60), which, as a rule, is supported resiliently on the vehicle body. A shaft (30) driving the driven wheel is arranged in the hollow axle body (60). In this case, the drive shaft (30) is connected to a differential housing (not illustrated here).

The rolling bearing unit (10) comprises, inter alia, an inner race (12) rotating with the drive shaft (30) and an outer race (11) arranged in the axle body (60). In its region oriented toward the outside of the vehicle, the inner race (12) is connected to the drive shaft (30) via a shaft-hub connection (34, 19).

A brake disk (40) and a wheel flange (45) are fastened to a flange (17) at the end of the inner race (12) by means of hub screws (2). The brake disk (40) comprises, inter alia, a friction ring (52) and a brake-disk chamber (42). The rims (not illustrated here) of the wheels are fastened releasably to the wheel flange (45).

A sealing element (70) is arranged between the axle body (60) and the drive shaft (30). Said sealing element seals a cavity (1) between the drive shaft (30) and the axle body (60), the cavity being connected to the interior of the differential housing.

The drive shaft (30) is divided into three regions. At both of its ends, the drive shaft (30) bears profiles, on the shaft side, of a shaft-hub connection while the central region is of at least approximately cylindrical design. A central threaded hole (33) is arranged on its end side which is oriented toward the outside of the vehicle.

The profile on the shaft side (not illustrated in FIG. 1) is used to connect the drive shaft (30) in a form-fitting manner to the outlet from the differential housing. In the first region, the drive shaft (30) is designed, for example, as a splined shaft profile. Instead of a splined shaft profile, use may also be made of a serrated profile, a polygonal profile, etc. In this region of the drive shaft (30), the outside diameter is at least 5% larger than in the central region. At least the outer end of the splined shaft profile can be beveled, for example, at an angle of 15°–25° with respect to the horizontal.

The second, central and cylindrical region of the drive shaft (30) has a virtually constant diameter. A cylindrical subsection (36) can have, for example, a small surface roughness, for example with a peak-to-valley height $R_t$ of between 1 and 4 μm. In this subsection (36), at least the surface of the drive shaft (30) can have a hardness of, for example, 45–60 HRC.

In the third region of the drive shaft (30), which region is oriented toward the outside of the vehicle, the outside diameter of the drive shaft (30) is smaller than in the central region. The profile (34), which is on the shaft side, of this shaft-hub connection may be a splined shaft profile, for example. It then has, for example, 20 splines on the circumference of the shaft section, a spline having two parallel flanks in each case. Between the splines (35) the diameter of the drive shaft is, for example, approximately 10% smaller than the outer circumference. It is also possible in this case for the profile (34), on the shaft side, of the shaft-hub connection to be a serrated profile, a polygonal profile, etc.

The rolling bearing unit (10) mounted on the drive shaft (30) is, for example, a tapered roller bearing in two rows with an O-arrangement. It comprises two inner races (12, 22) and an outer race (11) between which the rolling bodies (13) are arranged. The inner race (12), which is tubular in some regions, is designed as a flange (17) at its outwardly oriented end. The flange (17) extends radially outward in this case. A plurality of continuous threaded holes (18) are arranged on a graduated circle therein.

The inner surface of the inner race (12) is divided into two regions of different diameter. A first region in the vicinity of the flange (17) is approximately the same length as the splined shaft profile (34) of the drive shaft (30). The hub profile (19), the mating profile of the splined shaft profile (34) of the drive shaft (30), is arranged in the hole of this region. The grooves, for example 20 grooves, are the width of the splines (35) of the splined shaft profile (34) and are centered on their flanks. The inside diameter of the hub profile (19) is approximately 10% smaller than the outside diameter of the splined shaft profile (34).

The hub profile (19) peters out toward the center of the vehicle into an undercut which is adjoined by the second region (15) of the inner surface of the inner race (12). This second region (15) is hollow cylindrical and is approximately the length of the outer race (11) of the rolling bearing unit (10). The inner race uses this region (15) to sit on the cylindrical region of the drive shaft (30).

A rolling bearing track (14) is arranged on the outside of the inner race (12) via the cylindrical region (15) of the inner surface. A cylindrical region and a thread (16) adjoin the inner race (12) toward the center of the vehicle after an intermediate section.

A second inner race (22) is arranged on the cylindrical region. This inner race also has a rolling bearing track (23) on its outer surface. The bearing clearance of the rolling bodies (13) is set via this inner race (22) with the aid of a setting nut (24) fitted on the thread (16).

The outer race (11) of the rolling bearing unit (10) includes two running tracks for the rolling bodies (13) on its inside. The outside of the outer race (11) is cylindrical.

Instead of in an O-arrangement, the bearing unit (10) may also be arranged in an X-arrangement. In this case, for example, the outer race (11) of the bearing unit (10) is divided. The bearing clearance is then set at the outer race (11).

The axle body (60), which may also be part of a steerable axle, is a tube which is open at its ends and has an outside diameter which is cylindrical at least in some regions. The inner surface (65) of the axle body (60) is divided into a plurality of regions of different diameter, the common central line of which coincides with the axis of rotation (8), and which lie concentrically with respect to the outer surface of the axle body (60).

A bearing seat (62) is arranged in the first region, at that free end of the axle body (60) which faces away from the fastening to the vehicle. Said bearing seat is bounded toward the center of the vehicle by an axle body shoulder (63) and toward the free end by a thread (64). The outer race (11) of the tapered rolling bearing (10), which is in two rows, is supported on the bearing seat (62). The outer race (11) is clamped against the axle body shoulder (63) via a torsionally secured supporting washer (6) with the aid of a securable hub nut (5). In this case, the hub nut (5) may have a shaft sealing ring (7) which bears against the inner race (12).

The sealing element (70) is arranged in a further region (67) of the inner surface (65). In this region (67), the diameter of the inner surface (65) is approximately two thirds of the diameter of the bearing seat (62).

In the case of a rolling bearing unit (10) in an X-arrangement, for example, the axle body (60) may also form an outer race of the rolling bearing unit. A rolling bearing track (14) for the rolling bodies (13) is then arranged on the inner surface of said outer race. The rolling bearing unit (10) may also be designed in the form of a single row or as a pre-set bearing.

The brake-disk chamber (42) is arranged around the axle body (60). Said chamber has a cylindrical inner and outer contour. In this case, the outside diameter of the brake-disk chamber (42) is approximately 15–25% larger than its inside diameter. It has a fastening flange (43) at its end oriented toward the outside of the wheel. Said fastening flange is oriented perpendicular with respect to the axis of rotation (8) of the wheel and comprises two mutually parallel and flat sides. Holes (44) in alignment with the threaded holes (18) of the inner race (12) are arranged on this fastening flange (43).

A friction ring (52) is arranged on the outer surface of the brake-disk chamber (42), at its end which is oriented toward the center of the vehicle. An assembly joint can be arranged in the transition point (51), the "shielding".

The friction ring (52) may be connected non-releasably or releasably to the brake-disk chamber (42). In the case of a releasable connection, this can be, for example, a form-fitting shaft-hub connection in the form of a multi-groove profile, a serrated profile, etc.

The parallel outer surfaces of the friction ring (52) form the friction surfaces (53) against which the brake linings bear during braking. The outside diameter of the friction ring

(52) is, for example, approximately 75% larger than the outside diameter of the outer surface of the brake-disk chamber (42).

The wheel flange (45) sits on the outer contour of the brake-disk chamber (42). In this case, the wheel flange (45) is arranged approximately over half of the entire length of the brake-disk chamber (42) and is centered on the latter. The wheel flange (45) merges toward the outside of the vehicle into a wheel-flange chamber (48). This wheel-flange chamber (48) has a cylindrical outer surface at least in some regions and, at its end side, a fastening flange (49) with passage holes (56) which lie on a graduated circle. In the fitted state, the passage holes (56) of the wheel flange (45) lie over the passage holes (44) of the brake-disk chamber (42) and the threaded holes (18) of the inner race (12). The hub screws (2) are then inserted into the holes (18) and tightened with a prestressing force.

The outside diameter of the wheel flange (45) is approximately one and a half times as large as the diameter of the wheel-flange chamber (48). On its side oriented toward the outside of the wheel, the wheel flange (45) has a wheel-supporting surface (46). The latter is a flat, machined annular surface which is arranged perpendicular with respect to the axis of rotation (8) of the wheel. The maximum diameter of the wheel-supporting surface (46) corresponds to the maximum outside diameter of the wheel flange (45), and the inside diameter corresponds approximately to the diameter of the wheel-flange chamber (48). In this case, the usable minimum inside diameter of a friction surface (53) of the friction ring (52) is smaller than the maximum outside diameter of the wheel-supporting surface (46) on the wheel flange (45). A release notch is arranged between the machined wheel-supporting surface (46) and the cylindrical section of the outer surface of the wheel-flange chamber (48). The wheel-supporting surface (46) is part of a plane which cuts approximately centrally across the bearing (10). Parallel to the axis of rotation (8) of the wheel, passage holes (47) are arranged on a graduated circle in the wheel-supporting surface (46). The fastening means for fastening the rims are arranged in these holes (47). That end surface of the wheel flange (45) which is oriented toward the inside of the wheel is parallel to the wheel-supporting surface (46). This surface is likewise an annular surface, but its inside diameter is approximately 10% larger than the inside diameter of the wheel-supporting surface (46).

The arrangement of the wheel flange (45) on the brake-disk chamber (42) causes forces from the wheel flange (45) to be introduced into the radial outer side of the brake-disk chamber (42).

A securing washer (4) and a plain washer (3), for example in the form of a disk spring, are arranged on the end side (32) of the drive shaft (30). Both washers have a central hole. A fastening screw (9), the thread of which is screwed into the threaded hole (33), fastens the two washers (3, 4) on the drive shaft (30). In this case, the outer edge of the securing washer (4) presses against the inner race (12) of the rolling bearing unit (10). On its side oriented toward the outside of the vehicle, the disk spring (3) bears against the inside of the fastening flange (49) of the wheel flange (45). This secures the drive shaft (30) against axial displacement. This connection is not undone for the purpose of removing the brake disk (40).

The sealing element (70) is arranged between the rolling bearing unit (10) and the differential housing. Said sealing element is of annular construction and bears with its outside against the second section (67) of the inner surface (65) of the axle body (60) while its inside, for example, touches the subsection (36) of the drive shaft (30). The length of the sealing element (70) corresponds approximately to double the difference of the hole diameter of the axle body (60) and of the outside diameter of the drive shaft (30) in the region of the sealing element (30). In other words, the height of the sealing element (70) is smaller than one third of its length.

The sealing element (70) is of c-shaped construction in cross-section, the inner and the outer limbs of the C being approximately the same length and being situated approximately one above the other. In this case, the opening of the C points in the direction of the differential housing. The sealing element (70) therefore bounds the cavity (1) which communicates with the interior of the differential housing. The sealing element (70) comprises an elastomer body (71), which consists, inter alia, of an outer casing (72), a bottom casing (73) and a membrane (74). The length of the coiling of the elastomer body (71) corresponds approximately to four times the difference between the inside diameter of the axle body (60) and the outside diameter of the drive shaft (30).

Before the rolling bearing unit (10) is installed, first of all, for example, the securable hub nut (5) is pushed together with the shaft sealing ring (7) onto the inner race (12). After the rolling bodies (13), which are oriented toward the outside of the wheel, are installed on the rolling bearing track (14) of the inner race (12), the outer race (11) is inserted. After that, the second row of rolling bodies (13) and the second inner race (22) are inserted. The clearance in the rolling bearing unit (10) can then be set with the aid of the securing nut (24), which can be secured if appropriate.

The rolling bearing unit (10) preassembled in this manner is then inserted into the space between the drive shaft (30) and the axle body (60). If appropriate, one of the two bearing seats in this case has a press fit. In this connection, the shaft sealing ring (7) may support the hub nut (5) on the inner race (12). During installation, the tightening of the hub nut (5), for example with the aid of a hook wrench, in the thread (64) of the axle body (60) causes the outer race (11) of the rolling bearing unit (10) to be pressed the rolling bearing unit (10) against the axle body shoulder (63) and to be secured in the axle body (60).

During installation of the rolling bearing unit (10), the shaft-side profile (34) of the drive shaft (30) come into engagement in a form-fitting manner with the hub-side profile (19) of the inner race (12). In this case, the respective flanks are placed against each other, for example in a splined shaft connection.

After installation of the axial securing means (3, 4, 9), the brake disk (40) and the wheel flange (45) are fitted and fastened by the hub screws (2).

In order to remove the brake disk (40), the hub screws (2) are undone. The fastening screw (9) is not removed. The brake disk (40) and the wheel flange (45) can then be removed together or separately.

If a new brake disk (40) is fitted, the latter is fastened together with the wheel flange (45) to the inner race (12). The brake disk (40) is centered here on the outer surface of the inner race (12). The hub screws (2) secure the frictional connection between the brake disk (40) together with the wheel flange (45) and the inner race (12).

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

The invention claimed is:

1. A wheel bearing for a driven rigid axle, comprising:
   a drive shaft,
   a rolling bearing unit which comprises at least one inner race and at least one outer race, an inner race which is oriented in a direction toward an outside end of the axle being designed with an end flange aligned in the outside direction and, at least along a partial region of its length, a hub profile of a shaft-hub connection, the hub profile being connected to a complementary profile arranged on the drive shaft,
   an axle body which is arranged to be mounted in a rotationally fixed manner on a vehicle body, radially surrounds the drive shaft at least along a partial region of its length and forms or accommodates an outer race of the rolling bearing unit,
   a wheel flange which accommodates at least one drive wheel, and
   a brake disk which comprises a friction ring and a brake-disk chamber,
   brake disk being releasably fastened together with the wheel flange to the end flange of the inner race.

2. The wheel bearing as claimed in claim 1, wherein the wheel bearing unit is in two rows.

3. The wheel bearing as claimed in claim 1, wherein the smallest usable diameter of the friction ring is smaller than the smallest diameter of the wheel-supporting surface.

4. The wheel bearing as claimed in claim 1, wherein the wheel flange is arranged on the outer contour of the brake-disk chamber.

5. The wheel bearing as claimed in claim 1, wherein the wheel flange introduces force on the radial outer side of the brake-disk chamber.

6. The wheel bearing as claimed in claim 1, wherein at least one sealing element is arranged between the axle body and the drive shaft, said sealing element sealing a cavity which is situated between the drive shaft and the axle body and communicates with the interior of a differential housing.

7. The wheel bearing as claimed in claim 1, wherein at least one frictional, releasable connection is arranged between the inner race and the wheel flange.

8. A wheel bearing for a driven rigid axle of a vehicle, comprising:
   a drive shaft,
   a rolling bearing unit which comprises an inner race and an outer race, wherein the inner race includes an end flange facing away from the vehicle and includes a hub, wherein the hub is connected to a complementary profile on the drive shaft,
   an axle body that is arranged to be mounted in a rotationally fixed manner on the vehicle's body, wherein the axle body at least partially surrounds the drive shaft and includes or contains an outer race of the rolling bearing unit,
   a wheel flange for attachment of a drive wheel, and
   a brake disk which includes a friction ring and a brake-disk chamber, the brake disk being releasably fastened to the wheel flange and to an end flange of the inner race.

9. The wheel bearing as claimed in claim 8, wherein the wheel bearing unit includes two rows.

10. The wheel bearing as claimed in claim 8, wherein the wheel flange includes a wheel-supporting surface, and wherein a smallest usable diameter of the friction ring is smaller than a smallest diameter of the wheel-supporting surface.

11. The wheel bearing as claimed in claim 8, wherein the wheel flange is arranged on an outer contour of the brake-disk chamber.

12. The wheel bearing as claimed in claim 8, wherein the wheel flange introduces force on a radial outer side of the brake-disk chamber.

13. The wheel bearing as claimed in claim 8, further comprising at least one sealing element that is arranged between the axle body and the drive shaft, the sealing element sealing a cavity that is between the drive shaft and the axle body and communicates with an interior of a differential housing.

14. The wheel bearing as claimed in claim 8, further comprising at least one frictional, releasable connection between the inner race and the wheel flange.

* * * * *